P. B. GODDARD.
Gas Purifier.
No. 22,233.
Patented Dec. 7, 1858.
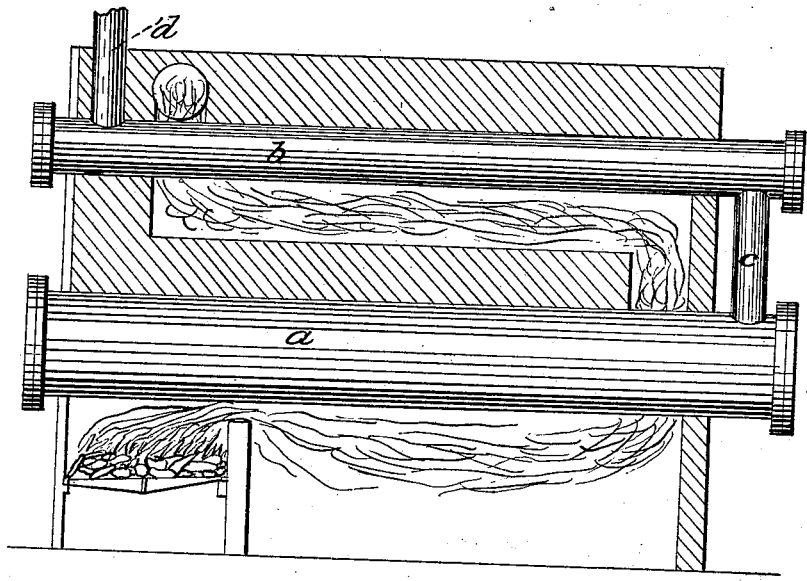

UNITED STATES PATENT OFFICE.

PAUL B. GODDARD, OF PHILADELPHIA, PENNSYLVANIA.

COMPOSITION FOR PURIFYING GAS.

Specification of Letters Patent No. 22,233, dated December 7, 1858.

*To all whom it may concern:*

Be it known that I, PAUL B. GODDARD, of Philadelphia, county of Philadelphia, and State of Pennsylvania, have invented certain new and useful Improvements in Purifying Illuminating-Gas; and I do hereby declare that the following is a full, clear, and exact description of the same—that is to say—

My invention consists in a new composition of materials for the purifying of gas made from coal or other substances, whereby I am enabled to deliver a larger amount of purified gas from the gas making and purifying materials than has been hitherto obtained. The materials I employ are charcoal, some saccharine substance, and lime. These are placed in tubes or cells of any convenient form in proportion to the quantity of gas to be made, said tubes or cells being connected with the retorts in such manner that the gas as it comes over from the retorts shall pass through these tubes, while the said tubes and their contents are at about a cherry red heat. An example of such arrangement of the tubes and the retorts is exhibited in the annexed drawings, wherein—

(*a*) represents the retorts, being of usual construction, (*b*) the tube or cell into which the purifying materials are placed, (*c*) the communicating pipe between the two, and (*d*) the pipe leading to the gasometer. These retorts and pipes may be either of iron or clay, and, as shown, are set in the brick work that the retort will receive the most intense heat, while the tube (*b*) will still have sufficient for its proper employment.

The simplest process of combination is to mix the saccharine matter, say brown sugar or molasses, with water, and in this to dissolve the lime. The charcoal is to be immersed in this lime water until as large a quantity has been absorbed by the charcoal as it will take up, for which a period of about thirty minutes will usually suffice. The charcoal thus prepared is placed loosely in the cells of tubes and the gas made in the retort, passes through the purifying materials on its way to the receiver.

As a purifying agent in the manufacture of gas, lime has been heretofore used, but it dissolves so sparingly in water that only a small portion of the lime employed was hitherto utilized, but the introduction of the saccharine matter into the water causes a chemical action by which the lime is more abundantly dissolved. In this state it is rapidly taken up by the carbonaceous matter brought into contact with it, and as the crude gas in coming from the retort must pass through the lime impregnated carbon, the molecules of gas and the molecules of lime are thereby brought into contact and a complete and thorough purification is the result. The quantity of saccharine matter which will effect the object advantageously will be, if molasses be employed, about ten per centum of the quantity of water, and as much lime as this mixture will dissolve is to be then added, and afterward, the pieces of charcoal are to be immersed until they have absorbed as much of the lime water as they will take up. The saccharine matter is not lost, as, by the heat, it is converted into gas rich in carbon, which mixing with the gas generated, adds to its illuminating quality.

For the purifying of illuminating gas I claim—

The use of lime dissolved in a saccharine solution, whether combined or not with other substances substantially as set forth herein.

In testimony whereof I have hereunto subscribed my name.

PAUL B. GODDARD.

Witnesses:
D. MALON GODWIN,
M. H. MANNING.